(12) United States Patent
Zhang et al.

(10) Patent No.: US 12,028,100 B2
(45) Date of Patent: Jul. 2, 2024

(54) METHOD AND DEVICE FOR DOWNLINK SIGNAL TRANSMISSION IN DUAL-CONNECTION ARCHITECTURE, AND TERMINAL

(71) Applicant: HUIZHOU TCL MOBILE COMMUNICATION CO., LTD., Guangdong (CN)

(72) Inventors: Hua Zhang, Guangdong (CN); Dingning Wen, Guangdong (CN); Yu Jia, Guangdong (CN); Longxi Tao, Guangdong (CN); Yanyun Zen, Guangdong (CN)

(73) Assignee: HUIZHOU TCL MOBILE COMMUNICATION CO., LTD., Guangdong (CN)

( * ) Notice: Subject to any disclaimer, the term of this patent is extended or adjusted under 35 U.S.C. 154(b) by 88 days.

(21) Appl. No.: 17/757,228

(22) PCT Filed: Jan. 6, 2020

(86) PCT No.: PCT/CN2020/070478
§ 371 (c)(1),
(2) Date: Jun. 13, 2022

(87) PCT Pub. No.: WO2021/114444
PCT Pub. Date: Jun. 17, 2021

(65) Prior Publication Data
US 2023/0006705 A1    Jan. 5, 2023

(30) Foreign Application Priority Data
Dec. 13, 2019   (CN) .......................... 201911284999.6

(51) Int. Cl.
H04B 1/10   (2006.01)
H04B 1/00   (2006.01)
H04B 1/40   (2015.01)

(52) U.S. Cl.
CPC .......... *H04B 1/1036* (2013.01); *H04B 1/005* (2013.01); *H04B 1/40* (2013.01)

(58) Field of Classification Search
CPC ......... H04B 1/1036; H04B 1/005; H04B 1/40
(Continued)

(56) References Cited

U.S. PATENT DOCUMENTS 6,904,266 B1 *  6/2005  Jin ..................... H04B 7/15571
                                                    370/293
9,374,056 B2 *  6/2016  Bagger ................ H03G 3/3042
(Continued)

FOREIGN PATENT DOCUMENTS

CN   107634766 A   1/2018
CN   107835034 A   3/2018
(Continued)

OTHER PUBLICATIONS

Written Opinion of the International Search Authority in international application No. PCT/CN2020/070478, mailed on Sep. 16, 2020.
(Continued)

*Primary Examiner* — Emmanuel Bayard
(74) *Attorney, Agent, or Firm* — PV IP PC; Wei Te Chung; Zhigang Ma

(57) ABSTRACT

A method and device for downlink signal transmission in a dual-connection architecture, and a terminal. The method comprises: when a first signal receiver and a second signal transmitter both operate, after a second uplink signal and a higher harmonic signal of a first uplink signal enter a first downlink and before entering the first signal receiver, using
(Continued)

a notch filter arranged on the first downlink to filter out a signal located in a preset frequency band in the second uplink signal.

18 Claims, 4 Drawing Sheets

(58) Field of Classification Search
USPC .................................................. 375/219–221
See application file for complete search history.

(56) References Cited

U.S. PATENT DOCUMENTS

| | | | |
|---|---|---|---|
| 2005/0191973 A1* | 9/2005 | Kanazawa | H03F 3/24 455/127.1 |
| 2015/0244414 A1* | 8/2015 | Yu | H04B 1/109 455/73 |
| 2019/0104476 A1 | 4/2019 | Lim | |
| 2020/0322932 A1* | 10/2020 | Kim | H04W 16/14 |
| 2021/0376989 A1* | 12/2021 | Lim | H04L 5/0092 |

FOREIGN PATENT DOCUMENTS

| | | | | |
|---|---|---|---|---|
| CN | 108141750 A | * | 6/2018 | ........... H04L 5/0044 |
| CN | 108401531 A | | 8/2018 | |
| CN | 108429554 A | | 8/2018 | |
| CN | 108933610 A | | 12/2018 | |
| CN | 109768810 A | | 5/2019 | |
| CN | 109889216 A | | 6/2019 | |
| CN | 110138411 A | | 8/2019 | |
| EP | 1145453 B1 | * | 5/2003 | ............. H04B 1/005 |
| WO | WO-2019120126 A1 | * | 6/2019 | ........... H04W 16/14 |

OTHER PUBLICATIONS

International Search Report in International application No. PCT/CN2020/070478, mailed on Sep. 16, 2020.
CHTTL, "TSG-RAN Working Group 4 (Radio) meeting #90bis R4-1903298", TP for TR 37.716-11-11: UE requirements for DC_7_n1, DC_7-7_n1, (Apr. 12, 2019).
CMCC, "3GPP TSG-RAN WG4 Meeting #88bis R4-1812548", Proposal on P-Max for 5G NR HPUE Cell selection issue, (Oct. 12, 2018).
The First Office Action Dated Sep. 3, 2020 from Chinese patent Application No. 201911284999.6. p. 1-7.

* cited by examiner

METHOD AND DEVICE FOR DOWNLINK SIGNAL TRANSMISSION IN DUAL-CONNECTION ARCHITECTURE, AND TERMINAL

This application claims the benefits of International Application No. PCT/CN2020/070478, filed Jan. 6, 2020, which claims priority to Chinese Application No. 201911284999.6, filed on Dec. 13, 2019. The entire disclosures of each of the applications are incorporated herein by reference.

TECHNICAL FIELD

The present invention relates to a dual connectivity architecture, and more particularly to a method, device and terminal for downlink signal transmission in the dual connectivity architecture.

DESCRIPTION OF RELATED ARTS

With the development and success of 4G mobile communication (Long Term Evolution (LTE) technology and LTE-A), people begin to pay more attention to 5G mobile communication. As 4G evolves to 5G, 5G radio access network (NR), 5G core network, 4G core network, and 4G radio access network (LTE) mix and match to form an evolution route for multiple network deployment options, such as, (1) Non-Standalone (NSA) mode: 4G core network is connected, 4G base station is a primary station, 5G base station is a secondary station, (2) Standalone (SA) mode: 5G core network is introduced but only 4G base station is connected to 5G core network, (3) Non-Standalone (NSA) mode: 5G core network is introduced, 5G base station is a primary station, 4G base station is a secondary station, and many other modes on the evolution route.

It can be seen from the afore-described evolution routes that in the NSA mode, if a terminal wants to realize 4G and 5G wireless communication at the same time, the terminal has to be equipped with a 4G signal transceiving device and a 5G signal transceiving device. However, in practical applications, when the 4G signal transceiving device and the 5G signal transceiving device are working at the same time, direct or indirect interaction may likely occur between the signals of different frequency bands. For example, cross modulation occurred between signals within a 5G N78 frequency band and a third-order harmonic of 4G uplink signals will have a serious impact on 4G downlink signals and blockage will be caused for 4G reception frequency bands. In severe cases, this may cause the 4G signal transceiving device to drop the connection. Therefore, there is a cross-modulation interference problem for signals of different frequency bands when the 4G signal transceiving device and the 5G signal transceiving device are working at the same time.

Technical Problems

The embodiments of the present invention provides a method, device and terminal for downlink signal transmission in a dual connectivity architecture, which can utilize a notch filter arranged on a first downlink to filter out a part of a second uplink signal within a preset frequency band after the second uplink signal and a high-order harmonic of a first uplink signal go into the first downlink and before into a first signal receiver, thereby fundamentally solving the problem of direct or indirect cross-modulation interference that may be generated between signals of different frequency bands.

Technical Solutions

In a first aspect, the present invention provides a method for downlink signal transmission in a dual connectivity architecture, including the steps of:
transmitting a first uplink signal along a first uplink direction by a first signal transmitter in the dual connectivity architecture, and receiving, by a first signal receiver in the dual connectivity architecture, a signal transmitted along a first downlink;
transmitting a second uplink signal along a second uplink direction by a second signal transmitter in the dual connectivity architecture; and
after the second uplink signal and a high-order harmonic of the first uplink signal go into the first downlink and before into the first signal receiver, utilizing a notch filter arranged on the first downlink to filter out a part of the second uplink signal within a preset frequency band, wherein an overlapped frequency band exists between a frequency band at which the first signal receiver operates and a frequency band where an interference signal formed after a mix of the part with the preset frequency band and the high-order harmonic of the first uplink signal is located.

An open-loop wire with a preset length connected in parallel to the first downlink serves as a notch filter, and the part of the second uplink signal within the preset frequency band is filtered out by using the open-loop wire with the preset length.

The open-loop wire is a line with a two-dimensional or three-dimensional spiral.

The dual connectivity architecture includes a long-term evolution (LTE) transceiver and a new radio (NR) transceiver, the LTE transceiver includes the first signal transmitter and the first signal receiver and the NR transceiver includes the second signal transmitter, the frequency band at which the first signal transmitter is 1920 MHz to 1980 MHz, the frequency band at which the first signal receiver operates is 2110 MHz to 2170 MHz, the frequency band at which the second signal transmitter operates is 3300 MHz to 3800 MHz, and the high-order harmonic is a third-order harmonic.

In a second embodiment, the present invention further provides a device for downlink signal transmission in a dual connectivity architecture, the device includes a notch filter arranged on a first downlink in the dual connectivity architecture, the dual connectivity architecture further includes a first uplink and a second uplink, two ends of the first uplink are connected to a first signal transmitter and a first antenna in the dual connectivity architecture respectively, a first power amplifier and a duplexer are sequentially arranged on the first uplink, the first antenna, the duplexer and the first signal receiver construct the first downlink, two ends of the second uplink are connected to a second signal transmitter and a second antenna in the dual connectivity architecture respectively, a second power amplifier and a bandpass filter are sequentially arranged on the second uplink, the first signal transmitter is configured to transmit a first uplink signal along a first uplink direction, the first signal receiver is configured to receive a signal transmitted along the first downlink, the second signal transmitter is configured to transmit a second uplink signal along a second uplink direction, the notch filter is configured to filter out a part of the second uplink signal within a preset frequency band on the first downlink, wherein an overlapped frequency band exists between a frequency band at which the first signal receiver operates and a frequency band where an interference signal formed after a mix of the part with the preset frequency band and a high-order harmonic of the first uplink signal is located.

The notch filter is an open-loop wire with a preset length, and the open-loop wire with the preset length is connected in parallel to the first downlink.

The open-loop wire is a line with a two-dimensional or three-dimensional spiral.

The dual connectivity architecture includes a long-term evolution (LTE) transceiver and a new radio (NR) transceiver, the LTE transceiver includes the first signal transmitter and the first signal receiver and the NR transceiver includes the second signal transmitter.

The frequency band at which the first signal transmitter is 1920 MHz to 1980 MHz, the frequency band at which the first signal receiver operates is 2110 MHz to 2170 MHz, the frequency band at which the second signal transmitter operates is 3300 MHz to 3800 MHz, and the high-order harmonic is a third-order harmonic.

In a third aspect, the present invention provides a terminal for downlink signal transmission in a dual connectivity architecture, the terminal is a wireless communication terminal including a device for downlink signal transmission in the dual connectivity architecture, the device including:

a notch filter (31) arranged on a first downlink in the dual connectivity architecture, the dual connectivity architecture further includes a first uplink and a second uplink, two ends of the first uplink are connected to a first signal transmitter (10) and a first antenna (13) in the dual connectivity architecture respectively, a first power amplifier (11) and a duplexer (12) are sequentially arranged on the first uplink, the first antenna (13), the duplexer (12) and the first signal receiver (30) construct the first downlink, two ends of the second uplink are connected to a second signal transmitter (20) and a second antenna (23) in the dual connectivity architecture respectively, a second power amplifier (21) and a bandpass filter (22) are sequentially arranged on the second uplink, the first signal transmitter (10) is configured to transmit a first uplink signal along a first uplink direction, the first signal receiver (30) is configured to receive a signal transmitted along the first downlink, the second signal transmitter (20) is configured to transmit a second uplink signal along a second uplink direction, the notch filter (31) is configured to filter out a part of the second uplink signal within a preset frequency band on the first downlink, wherein an overlapped frequency band exists between a frequency band at which the first signal receiver (30) operates and a frequency band where an interference signal formed after a mix of the part with the preset frequency band and a high-order harmonic of the first uplink signal is located.

The notch filter (31) is an open-loop wire with a preset length, and the open-loop wire with the preset length is connected in parallel to the first downlink.

The open-loop wire is a line with a two-dimensional or three-dimensional spiral.

Beneficial Effects

The present application provides a method, device and terminal for downlink signal transmission in a dual connectivity architecture. The method includes the steps of: transmitting a first uplink signal along a first uplink direction by a first signal transmitter in the dual connectivity architecture, and receiving, by a first signal receiver in the dual connectivity architecture, a signal transmitted along a first downlink; transmitting a second uplink signal along a second uplink direction by a second signal transmitter in the dual connectivity architecture; and after the second uplink signal and a high-order harmonic of the first uplink signal go into the first downlink and before into the first signal receiver, utilizing a notch filter arranged on the first downlink to filter out a part of the second uplink signal within a preset frequency band, wherein an overlapped frequency band exists between a frequency band at which the first signal receiver operates and a frequency band where an interference signal formed after a mix of the part with the preset frequency band and the high-order harmonic of the first uplink signal is located. Attenuation of the second uplink signal (e.g., signals within N78 band) is added to the first downlink. This can effectively address the problem of cross-modulation interference, thereby significantly reducing the noises received by the first signal receiver and improving the sensitivity of the first signal receiver.

BRIEF DESCRIPTION OF THE DRAWINGS

For explaining the technical solutions used in the embodiments of the present invention more clearly, the appended figures to be used in describing the embodiments will be briefly introduced in the following. Obviously, the appended figures described below are only some of the embodiments of the present invention, and those of ordinary skill in the art can further obtain other figures according to these figures without making any inventive effort.

Figure 1:
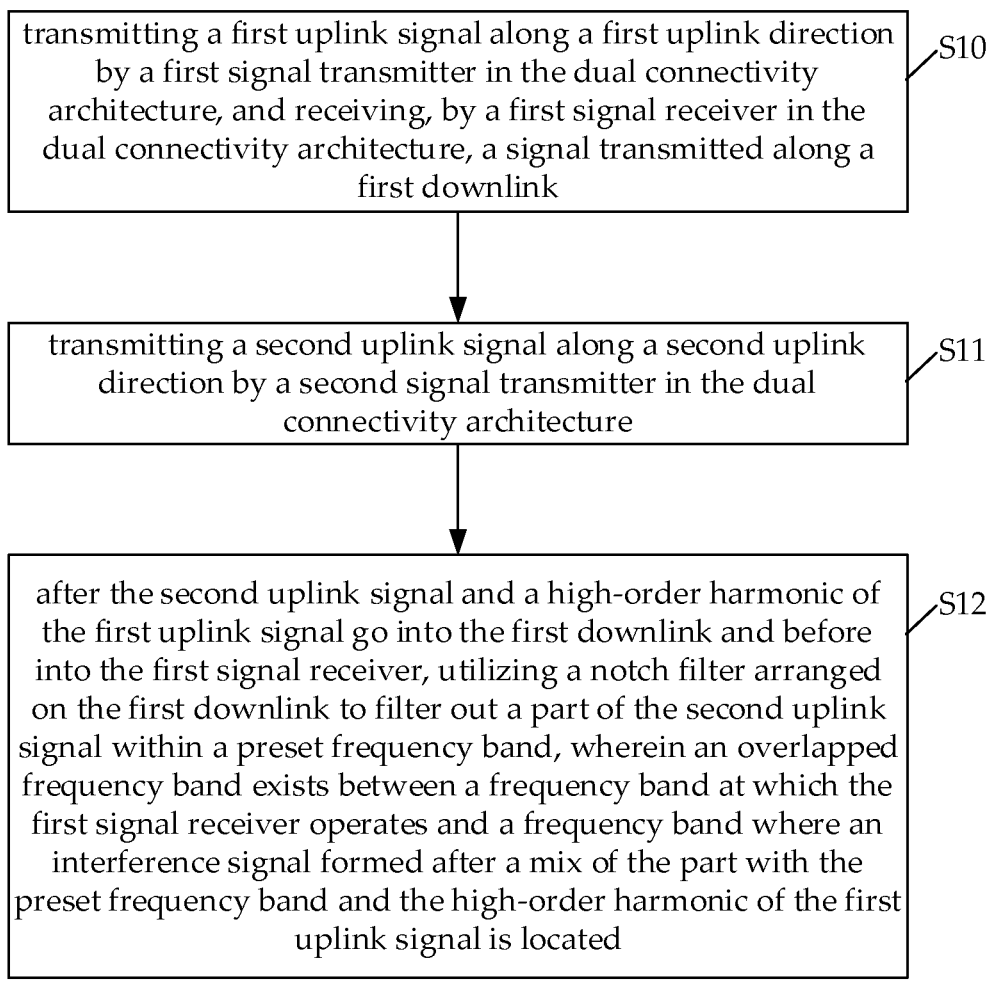
FIG. 1 is a schematic flowchart of a method for downlink signal transmission in a dual connectivity architecture according to an embodiment of the present invention.

In the drawings:
10 first signal transmitter; 11 first power amplifier; 12 duplexer; 13 first antenna; 20 second signal transmitter; 21 second power amplifier; 22 bandpass filter; 23 second antenna; 30 first signal receiver; 31 notch filter.

DETAILED DESCRIPTION

The technical solutions in a method, device and terminal for downlink signal transmission in a dual connectivity architecture provided in the embodiments of the present invention are clearly and completely described below with reference to appending drawings. Obviously, the described embodiments are merely a part of embodiments of the present invention and are not all of the embodiments. Based on the embodiments of the present invention, other embodiments obtained by those of ordinary skill in the art without making any inventive effort are within the scope the present invention seeks to be protected.

In the description of the present invention, it is to be understood that the terms "center", "longitudinal", "lateral", "length", "width", "thickness", "upper", "lower", "front", "rear", "left", "right", "vertical", "horizontal", "top", "bottom", "inner", "outer", and the like indicated orientation or positional relationship are based on the relationship of the position or orientation shown in the drawings, which is only for the purpose of facilitating description of the present invention and simplifying the description, but is not intended to or implied that the device or element referred to must have a specific orientation, and be constructed and operated in a particular orientation. Therefore, it should not be construed as a limitation of the present invention. In addition, the terms "first", "second" and "third" are used for descriptive purposes only, and should not be taken to indicate or imply relative importance, or implicitly indicate the indicated number of technical features. Thus, by defining a feature with "first", "second" or "third" may explicitly or implicitly include one or more features. In the description of the present invention, "a plurality" means two or more unless explicitly defined.

In the present invention, unless otherwise explicitly specified or limited, the terms "install", "connected", "connection" and "fasten" should be construed broadly, for example, a fixed connection, a removable connection, or integrally connected. These terms may be directed to a mechanical connection, and may also be an electrical connection. Moreover, these terms may means directly attached, be indirectly connected through an intermediate medium, and may be internally communicated with two components or the interaction relationship between two components, unless otherwise explicitly specified or limited. For persons skilled in the art, they can understand the specific meaning of the terms in the present invention based on specific conditions.

In the present invention, the word "exemplary" is used herein to mean "serving as an example, instance, or illustration." Any embodiment described herein as "exemplary" is not necessarily to be construed as preferred or advantageous over other embodiments. The following description is provided in order to implement and utilize the present invention by those of ordinary skill in the art. Details are also provided below for the purpose of explanation of the present invention. It should be understood that those of ordinary skill in the art can be acknowledged that the present invention is also achievable without these specific details. In other examples, well-known structures and processes will not be detailed described in order not to render the description of the present invention obscure by unnecessary details. Therefore, the present invention is not intended to be limited to the illustrated embodiments, but is to be consistent with the widest range covered by the disclosed principles and features of the present invention.

FIG. 1 is a schematic flowchart of a method for downlink signal transmission in a dual connectivity architecture according to an embodiment of the present invention. The present embodiment provides a method for downlink signal transmission in the dual connectivity architecture. Specifically, the method includes the following steps:

Step 10, transmitting a first uplink signal along a first uplink direction by a first signal transmitter 10 in the dual connectivity architecture, and receiving, by a first signal receiver 30 in the dual connectivity architecture, a signal transmitted along a first downlink. This indicates that both the first signal transmitter and receiver are working.

Step 11, transmitting a second uplink signal along a second uplink direction by a second signal transmitter 20 in the dual connectivity architecture. This indicates that the second signal transmitter 20, the first signal transmitter 10 and the first signal receiver 30 are working at the same time.

Figure 4:
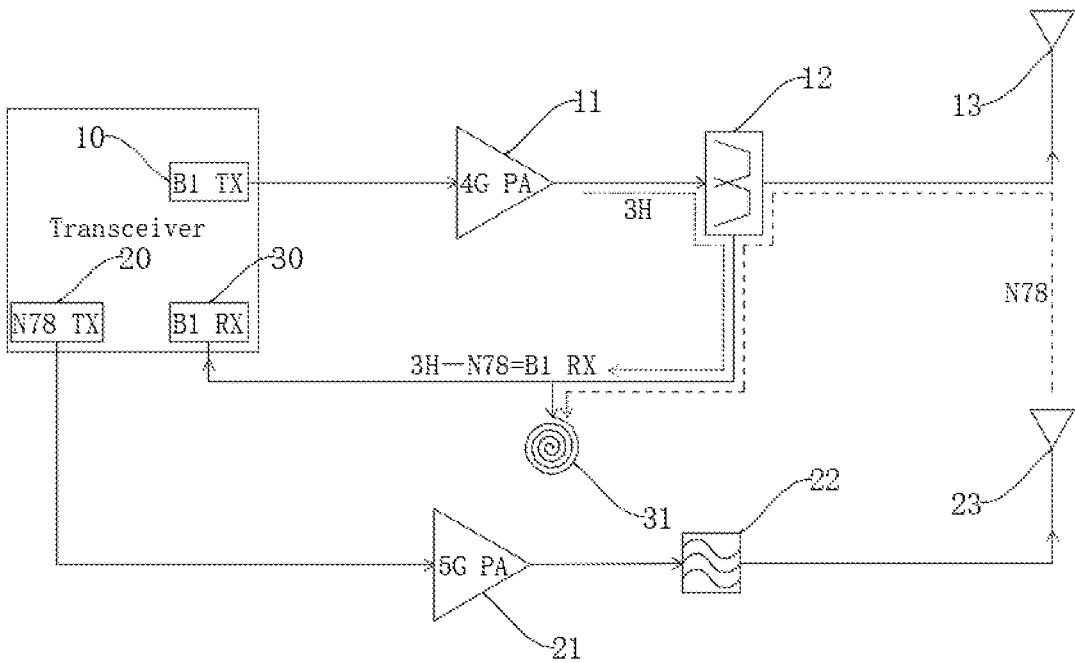
FIG. 4 is a schematic diagram illustrating working principles of a device for downlink signal transmission in a dual connectivity architecture according to the present invention.

In Step 12, referring also to FIG. 4, which is a schematic diagram illustrating working principles of a device for downlink signal transmission in the dual connectivity architecture according to the present invention, after the second uplink signal and a high-order harmonic of the first uplink signal go into the first downlink and before into the first signal receiver 30, a notch filter 31 arranged on the first downlink is utilized to filter out a part of the second uplink signal within a preset frequency band, thereby achieving the purpose of destroying a condition for causing cross-modulation products and preventing from generating the cross-modulation products (i.e., cross-modulation interference signals), and avoiding an impact on a B1 transceiver in the dual connectivity architecture. In the present invention, an overlapped frequency band exists between a frequency band at which the first signal receiver 30 operates and a frequency band where an interference signal formed after a mix of the part with the preset frequency band and the high-order harmonic of the first uplink signal is located. In a preferred embodiment, as an improved technical solution, an open-loop wire with a preset length connected in parallel to a path on the first downlink innovatively serves as the notch filter 31, and the part of the second uplink signal within the preset frequency band is filtered out by using the open-loop wire with the preset length. In the present embodiment, the open-loop wire further appears a line with a two-dimensional or three-dimensional spiral. Please refer to FIG. 5, which is a schematic diagram illustrating an open-loop wire with a two-dimensional spiral.

Figure 2:
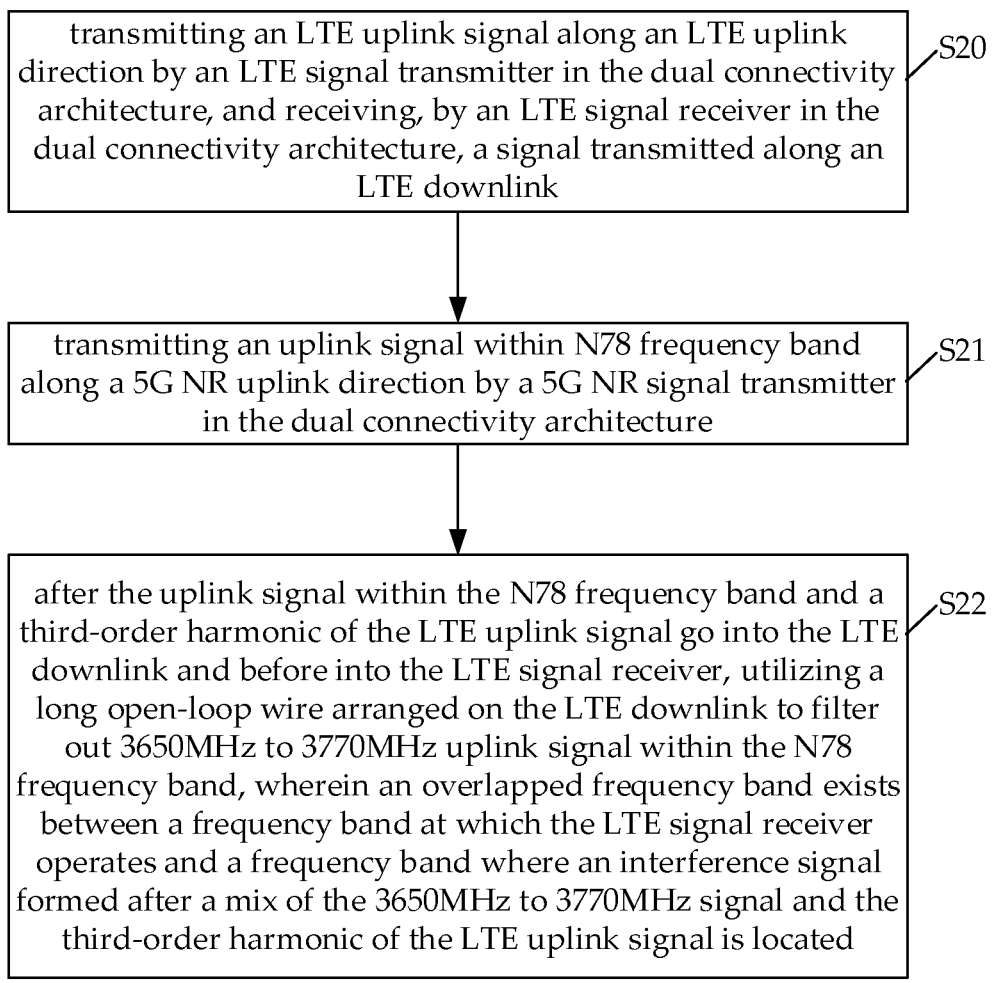
FIG. 2 is a schematic flowchart of a method for downlink signal transmission in a dual connectivity architecture according to another embodiment of the present invention.

FIG. 2 is a schematic flowchart of a method for downlink signal transmission in the dual connectivity architecture according to another embodiment of the present invention. The dual connectivity architecture may include an LTE/LTE-A transceiver (i.e., a 4G signal transceiving device) and a NR transceiver (i.e., a 5G signal transceiving device). The full name of LTE is Long Term Evolution. The full name of NR is New Radio. The A in LTE-A means Advanced. That is, the present invention is better applicable to a dual connectivity architecture made up by 4G LTE/LTE-A and 5G NR, especially suitable for an EN-DC dual connectivity architecture, where the E stands for E-UTRA, which indicates a 4G radio access network, the N stands for NR, which indicate 5G new radio, and DC stands for Dual Connectivity. The LTE transceiver includes the first signal transmitter 10 and the first signal receiver 30 and the NR transceiver may include the second signal transmitter 20 (and a second signal receiver). The frequency band at which the first signal transmitter 10 is 1920 MHz to 1980 MHz, the frequency band at which the first signal receiver 30 operates is 2110 MHz to 2170 MHz, and the frequency band at which the second signal transmitter 20 operates is 3300 MHz to 3800 MHz, that is, N78 frequency band in the 5G NR specification. Specifically, the high-order harmonic is a third-order harmonic. More specifically, in other embodiments of the present invention, processes may be formulated below, as shown in FIG. 2.

Step 20, when an LTE transceiver is connected, transmitting an LTE uplink signal along an LTE uplink direction by an LTE signal transmitter in the dual connectivity architecture, and receiving, by an LTE signal receiver in the dual connectivity architecture, a signal transmitted along an LTE downlink.

Step 21, transmitting an uplink signal within N78 frequency band along a 5G NR uplink direction by a 5G NR signal transmitter in the dual connectivity architecture.

In Step 22: the uplink frequencies of LTE band 1 are 1920 MHz to 1980 MHz, the downlink frequencies of LTE band 1 are 2110 MHz to 2170 MHz, and NR N78 frequencies are 3300 MHz to 3800 MHz. When LTE band 1 (Band 1) and NR N78 frequency band are working at the same time, there is a high possibility to generate cross-modulation interference between different signals. This scenario is described as follows. Cross-modulation products generated from a mix of 3650 MHz to 3770 MHz within the NR N78 frequency band and a third-order harmonic from a 4G power amplifier (first power amplifier 11) on the LTE band 1 uplink will fall within LTE Band 1 downlink frequency band. Signals of the NR 78 frequency band signal is coupled to the first antenna 13 via the second antenna 23 and then goes into a duplexer 12, and thus goes into LTE downlink, as shown in the following calculations: 1920×3−3650=2110 MHz, 1980×3−3770=2170 MHz, that is, a frequency band (i.e., the cross-modulation products) overlapped with signals received by the LTE signal receiver is generated. In the present embodiment, after the uplink signal within the N78 frequency band and a third-order harmonic of the LTE uplink signal go into the LTE downlink and before into the LTE signal receiver, a long open-loop wire arranged on the LTE downlink is utilized to filter out 3650 MHz to 3770 MHz uplink signal within the N78 frequency band. This is because an overlapped frequency band exists between a frequency band at which the LTE signal receiver operates and a frequency band where an interference signal formed after a mix of the 3650 MHz to 3770 MHz signal within the aforesaid frequency band and the third-order harmonic of the LTE uplink signal is located. Based on above improved technical solution, the present invention can destroy a condition for causing cross-modulation products generated by 3650 MHz to 3770 MHz within the NR N78 frequency band and the third-order harmonic from the 4G power amplifier (first power amplifier 11) on the LTE band 1 uplink, prevent from generating the cross-modulation products, and avoid an impact on the LTE transceiver (i.e., the B1 transceiver in FIGS. 3 and 4) in the dual connectivity architecture.

It should be understood that the order described for the above steps of the present invention does not limit the order of that actually performs. The steps can be performed in a certain order, or performed at the same time, or only part of the steps is performed. Which order or steps to be performed depends on actual work of the terminal.

Figure 3:
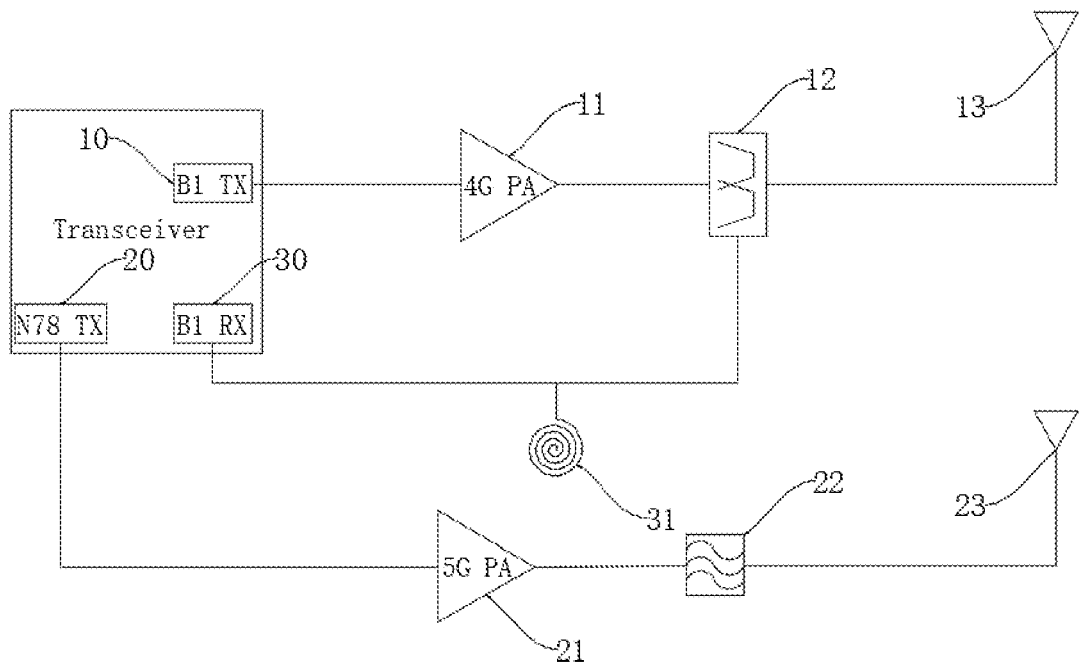
FIG. 3 is a schematic diagram illustrating the structure of a device for downlink signal transmission in a dual connectivity architecture according to the present invention.
Figure 5:
FIG. 5 is a schematic diagram illustrating an open-loop wire with a two-dimensional spiral.

FIG. 3 is a schematic diagram illustrating the structure of a device for downlink signal transmission in a dual connectivity architecture according to the present invention. FIG. 3 is a radio frequency (RF) block diagram. The present invention further provides a device for downlink signal transmission in the dual connectivity architecture. The device includes a notch filter 31 arranged on a first downlink in the dual connectivity architecture, the dual connectivity architecture further includes a first uplink and a second uplink, two ends of the first uplink are connected to a first signal transmitter 10 and a first antenna 13 in the dual connectivity architecture respectively, a first power amplifier (i.e., 4G PA, 4G power amplifier) 11 and a duplexer 12 are sequentially arranged on the first uplink, the first antenna 13, the duplexer 12 and the first signal receiver 30 construct the first downlink, two ends of the second uplink are connected to a second signal transmitter 20 and a second antenna 23 in the dual connectivity architecture respectively, a second power amplifier (i.e., 5G PA, 5G power amplifier) 21 and a bandpass filter 22 are sequentially arranged on the second uplink, the first signal transmitter 10 is configured to transmit a first uplink signal along a first uplink direction, the first signal receiver 30 is configured to receive a signal transmitted along the first downlink, the second signal transmitter 20 is configured to transmit a second uplink signal along a second uplink direction, the notch filter 31 is configured to filter out a part of the second uplink signal within a preset frequency band on the first downlink, wherein an overlapped frequency band exists between a frequency band at which the first signal receiver 30 operates and a frequency band where an interference signal formed after a mix of the part with the preset frequency band and a high-order harmonic of the first uplink signal is located. It can be understood that the equivalent of the present embodiment is a design of a radio frequency coexisting circuit (this model can be named as DC-1A-N78). As a further improved technical solution, the notch filter 31 is an open-loop wire with a preset length. The open-loop wire with the preset length is connected in parallel to the first downlink. The open-loop wire with the preset length is equivalent to a series-connected resonant circuit. FIG. 5 is a schematic diagram illustrating an open-loop wire with a two-dimensional spiral. The open-loop wire is a line with a two-dimensional or three-dimensional spiral. In some preferred embodiments, taking into account the influence of insertion loss and parasitic capacitance on an actual printed circuit board (PCB), the preset length of the open-loop wire is preferably between 450-500 mils, where "mil" means a unit of length "mil". In the present embodiment, tuning may be conducted based on actual environment of the board to form a resonant circuit at 3.6-3.8 GHz to filter out signals on the receiving channel at 3.6-3.8 GHz. More preferably, a long open-loop wire of 470 mil (theoretically simulated length) can serve as the notch filter. As shown in FIG. 5, the overall width of the open-loop wire with two-dimensional spiral (similar to the shape of a mosquito coil) can be 88 mil and the height can be 78 mil. When L1 is referenced to L2 in PCB laminated layers, its line width is 5 mil for 50Ω characteristic impedance. Specifically, in FIG. 5, a designed line width is 5 mil, line spacing is 5 mil, and it rotates from the center counterclockwise about 4 rounds.

Please refer to FIG. 4 with reference to FIGS. 1-3. FIG. 4 is a schematic diagram illustrating working principles of a device for downlink signal transmission in a dual connectivity architecture according to the present invention. The dual connectivity architecture includes a long-term evolution (LTE) transceiver and a new radio (NR) transceiver. The LTE transceiver includes the first signal transmitter 10 and the first signal receiver 30 and the NR transceiver includes the second signal transmitter 20. In some embodiments of the present invention, the LTE transceiver adopts a Frequency-Division Duplexing, FDD) architecture. The frequency band at which the first signal transmitter 10 is 1920 MHz to 1980 MHz, the frequency band at which the first signal receiver 30 operates is 2110 MHz to 2170 MHz, the frequency band at which the second signal transmitter 20 operates is 3300 MHz to 3800 MHz, and the high-order harmonic is a third-order harmonic.

Figure 6:
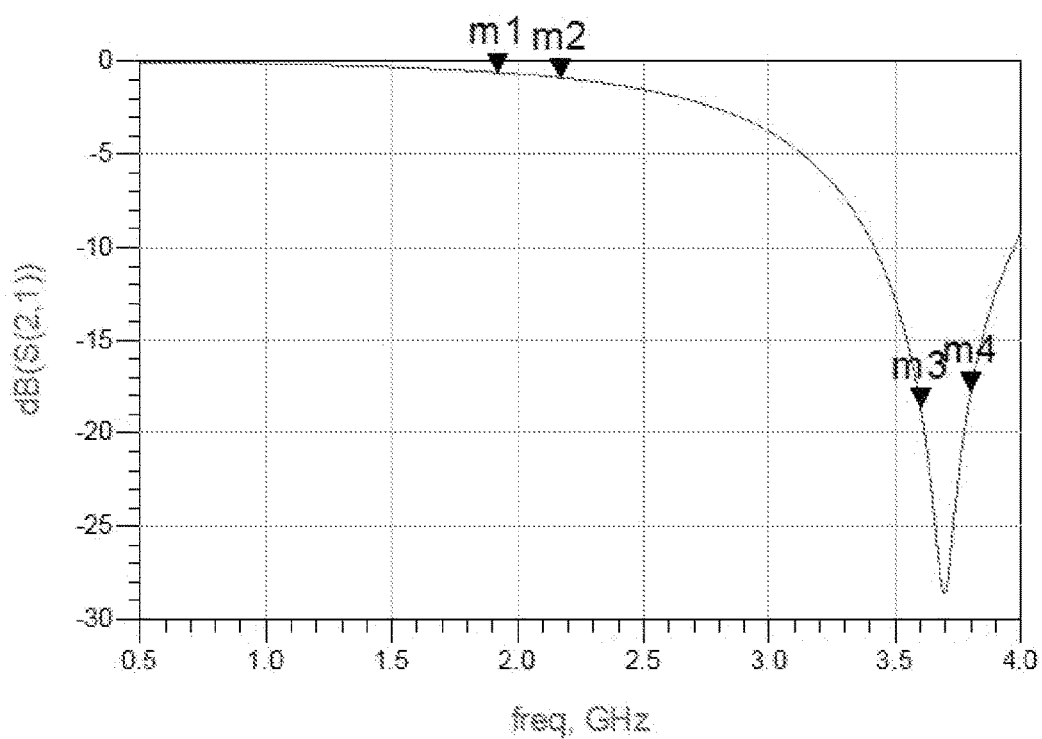
FIG. 6 is a schematic diagram illustrating an influence of a notch filter on noises from a long-term evolution (LTE) transceiver.

FIG. 6 is a schematic diagram illustrating an influence of a notch filter on noises from a long-term evolution (LTE) transceiver. m1: freq=1.920 GHz, dB(S(2, 1))=−0.595; m2: freq=2.170 GHz, dB(S(2, 1))=−0.884; m3: freq=3.600 GHz, dB(S(2, 1))=−18.589; m4: freq=3.800 GHz, dB(S(2, 1))=−17.760. It can be seen that this design increases the insertion loss of Band B1 by 0.8 dB roughly, but it has a suppression of about 17 dB for N78 (3600 to 3800 MHz). This can effectively reduce the influence of N78 on B1 reception.

The present invention further provides a terminal for downlink signal transmission in the dual connectivity architecture. The terminal is a wireless communication terminal including a device for downlink signal transmission in the dual connectivity architecture. The device includes a notch filter (31) arranged on a first downlink in the dual connectivity architecture, the dual connectivity architecture further includes a first uplink and a second uplink, two ends of the first uplink are connected to a first signal transmitter (10) and a first antenna (13) in the dual connectivity architecture respectively, a first power amplifier (11) and a duplexer (12) are sequentially arranged on the first uplink, the first antenna (13), the duplexer (12) and the first signal receiver (30) construct the first downlink, two ends of the second uplink are connected to a second signal transmitter (20) and a second antenna (23) in the dual connectivity architecture respectively, a second power amplifier (21) and a bandpass filter (22) are sequentially arranged on the second uplink, the first signal transmitter (10) is configured to transmit a first uplink signal along a first uplink direction, the first signal receiver (30) is configured to receive a signal transmitted along the first downlink, the second signal transmitter (20) is configured to transmit a second uplink signal along a second uplink direction, the notch filter (31) is configured to filter out a part of the second uplink signal within a preset frequency band on the first downlink, wherein an overlapped frequency band exists between a frequency band at which the first signal receiver (30) operates and a frequency band where an interference signal formed after a mix of the part with the preset frequency band and a high-order harmonic of the first uplink signal is located.

The notch filter (31) is an open-loop wire with a preset length, and the open-loop wire with the preset length is connected in parallel to the first downlink.

The open-loop wire is a line with a two-dimensional or three-dimensional spiral.

In some embodiments of the present invention, a terminal is also provided. The terminal may be a wireless communication terminal including the device for downlink signal transmission in the dual connectivity architecture in any of the above embodiments and/or using the method for downlink signal transmission in the dual connectivity architecture in any of the above embodiments. The terminal may be a device or equipment with wireless communication function, such as a smartphone, a tablet computer, a notebook computer, a smart bracelet, or a smart wearable device (e.g., a smart helmet, a smart glasses).

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method for downlink signal transmission in a dual connectivity architecture, comprising the steps of:
    transmitting a first uplink signal along a first uplink direction by a first signal transmitter in the dual connectivity architecture, and receiving, by a first signal receiver in the dual connectivity architecture, a signal transmitted along a first downlink;
    transmitting a second uplink signal along a second uplink direction by a second signal transmitter in the dual connectivity architecture; and
    after the second uplink signal and a high-order harmonic of the first uplink signal go into the first downlink and before into the first signal receiver, utilizing a notch filter arranged on the first downlink to filter out a part of the second uplink signal within a preset frequency band, wherein an overlapped frequency band exists between a frequency band at which the first signal receiver operates and a frequency band where an interference signal formed after a mix of the part with the preset frequency band and the high-order harmonic of the first uplink signal is located.

2. The method for downlink signal transmission in the dual connectivity architecture according to claim 1, wherein:
    an open-loop wire with a preset length connected in parallel to the first downlink serves as the notch filter, and the part of the second uplink signal within the preset frequency band is filtered out by using the open-loop wire with the preset length.

3. The method for downlink signal transmission in the dual connectivity architecture according to claim 2, wherein:
    the open-loop wire is a line with a two-dimensional or three-dimensional spiral.

4. The method for downlink signal transmission in the dual connectivity architecture according to claim 1, wherein:
    the dual connectivity architecture comprises a long-term evolution (LTE) transceiver and a new radio (NR) transceiver, the LTE transceiver comprises the first signal transmitter and the first signal receiver and the NR transceiver comprises the second signal transmitter, the frequency band at which the first signal transmitter is 1920 MHz to 1980 MHz, the frequency band at which the first signal receiver operates is 2110 MHz to 2170 MHz, the frequency band at which the second signal transmitter operates is 3300 MHz to 3800 MHz, and the high-order harmonic is a third-order harmonic.

5. The method for downlink signal transmission in the dual connectivity architecture according to claim 1, wherein:
    the first signal transmitter is a long-term evolution (LTE) transmitter, the first signal receiver is an LTE receiver, and the second signal transmitter is a 5G new radio (NR) transmitter.

6. The device for downlink signal transmission in the dual connectivity architecture according to claim 1, wherein: the first signal transmitter is a long-term evolution (LTE) transmitter, the first signal receiver is an LTE receiver, and the second signal transmitter is a 5G new radio (NR) transmitter.

7. The terminal for downlink signal transmission in the dual connectivity architecture according to claim 1, wherein: the first signal transmitter is a long-term evolution (LTE) transmitter, the first signal receiver is an LTE receiver, and the second signal transmitter is a 5G new radio (NR) transmitter.

8. A device for downlink signal transmission in a dual connectivity architecture, wherein: the device comprises a notch filter (31) arranged on a first downlink in the dual connectivity architecture, the dual connectivity architecture further comprises a first uplink and a second uplink, two ends of the first uplink are connected to a first signal transmitter (10) and a first antenna (13) in the dual connectivity architecture respectively, a first power amplifier (11) and a duplexer (12) are sequentially arranged on the first uplink, the first antenna (13), the duplexer (12) and a first signal receiver (30) construct the first downlink, two ends of the second uplink are connected to a second signal transmitter (20) and a second antenna (23) in the dual connectivity architecture respectively, a second power amplifier (21) and a bandpass filter (22) are sequentially arranged on the second uplink, the first signal transmitter (10) is configured to transmit a first uplink signal along a first uplink direction, the first signal receiver (30) is configured to receive a signal transmitted along the first downlink, the second signal transmitter (20) is configured to transmit a second uplink signal along a second uplink direction, the notch filter (31) is configured to filter out a part of the second uplink signal within a preset frequency band on the first downlink, wherein an overlapped frequency band exists between a frequency band at which the first signal receiver (30) operates and a frequency band where an interference signal formed after a mix of the part with the preset frequency band and a high-order harmonic of the first uplink signal is located.

9. The device for downlink signal transmission in the dual connectivity architecture according to claim 8, wherein: the notch filter (31) is an open-loop wire with a preset length, and the open-loop wire with the preset length is connected in parallel to the first downlink.

10. The device for downlink signal transmission in the dual connectivity architecture according to claim 9, wherein: the open-loop wire is a line with a two-dimensional or three-dimensional spiral.

11. The device for downlink signal transmission in the dual connectivity architecture according to claim 8, wherein: the dual connectivity architecture comprises a long-term evolution (LTE) transceiver and a new radio (NR) transceiver, the LTE transceiver comprises the first signal transmitter (10) and the first signal receiver (30) and the NR transceiver comprises the second signal transmitter (20).

12. The device for downlink signal transmission in the dual connectivity architecture according to claim 11, wherein: the frequency band at which the first signal transmitter (10) is 1920 MHz to 1980 MHz, the frequency band at which the first signal receiver (30) operates is 2110 MHz to 2170 MHz, the frequency band at which the second signal transmitter (20) operates is 3300 MHz to 3800 MHz, and the high-order harmonic is a third-order harmonic.

13. A terminal for downlink signal transmission in a dual connectivity architecture, wherein: the terminal is a wireless communication terminal comprising a device for downlink signal transmission in the dual connectivity architecture, the device comprising:
 a notch filter (31) arranged on a first downlink in the dual connectivity architecture, the dual connectivity architecture further comprises a first uplink and a second uplink, two ends of the first uplink are connected to a first signal transmitter (10) and a first antenna (13) in the dual connectivity architecture respectively, a first power amplifier (11) and a duplexer (12) are sequentially arranged on the first uplink, the first antenna (13), the duplexer (12) and a first signal receiver (30) construct the first downlink, two ends of the second uplink are connected to a second signal transmitter (20) and a second antenna (23) in the dual connectivity architecture respectively, a second power amplifier (21) and a bandpass filter (22) are sequentially arranged on the second uplink, the first signal transmitter (10) is configured to transmit a first uplink signal along a first uplink direction, the first signal receiver (30) is configured to receive a signal transmitted along the first downlink, the second signal transmitter (20) is configured to transmit a second uplink signal along a second uplink direction, the notch filter (31) is configured to filter out a part of the second uplink signal within a preset frequency band on the first downlink, wherein an overlapped frequency band exists between a frequency band at which the first signal receiver (30) operates and a frequency band where an interference signal formed after a mix of the part with the preset frequency band and a high-order harmonic of the first uplink signal is located.

14. The terminal for downlink signal transmission in the dual connectivity architecture according to claim 13, wherein: the notch filter (31) is an open-loop wire with a preset length, and the open-loop wire with the preset length is connected in parallel to the first downlink.

15. The terminal for downlink signal transmission in the dual connectivity architecture according to claim 14, wherein: the open-loop wire is a line with a two-dimensional or three-dimensional spiral.

16. The terminal for downlink signal transmission in the dual connectivity architecture according to claim 13, wherein: the dual connectivity architecture comprises a long-term evolution (LTE) transceiver and a new radio (NR) transceiver, the LTE transceiver comprises the first signal transmitter (10) and the first signal receiver (30) and the NR transceiver comprises the second signal transmitter (20).

17. The terminal for downlink signal transmission in the dual connectivity architecture according to claim 16, wherein: the frequency band at which the first signal transmitter (10) is 1920 MHz to 1980 MHz, the frequency band at which the first signal receiver (30) operates is 2110 MHz to 2170 MHz, the frequency band at which the second signal transmitter (20) operates is 3300 MHz to 3800 MHz, and the high-order harmonic is a third-order harmonic.

18. The device for downlink signal transmission in the dual connectivity architecture according to claim 13, wherein:
 the dual connectivity architecture comprises a long-term evolution (LTE) transceiver and a new radio (NR) transceiver, the LTE transceiver comprises the first signal transmitter and the first signal receiver and the NR transceiver comprises the second signal transmitter, the frequency band at which the first signal transmitter is 1920 MHz to 1980 MHz, the frequency band at which the first signal receiver operates is 2110 MHz to 2170 MHz, the frequency band at which the second signal transmitter operates is 3300 MHz to 3800 MHz, and the high-order harmonic is a third-order harmonic.

\* \* \* \* \*